United States Patent [19]

Ramaswami et al.

[11] Patent Number: 5,781,537
[45] Date of Patent: Jul. 14, 1998

[54] SETTING UP, TAKING DOWN AND MAINTAINING CONNECTIONS IN A COMMUNICATIONS NETWORK

[75] Inventors: Rajiv Ramaswami, Ossining, N.Y.; Adrian Segall, Haifa, Israel

[73] Assignee: International Business Machines Corporation, Armonk, N.Y.

[21] Appl. No.: 499,781

[22] Filed: Jul. 7, 1995

[51] Int. Cl.$^6$ .................................................. H04M 7/00
[52] U.S. Cl. .......................... 370/254; 370/390; 370/400; 370/396; 370/410; 340/826; 379/221; 395/182.02; 359/128
[58] Field of Search .................... 370/54, 55, 56, 370/58.1, 58.2, 58.3, 60, 60.1, 68.1, 241, 242, 244, 394, 250, 216, 217, 218, 225, 248, 351, 357, 360, 384, 385, 376, 377, 378, 381, 375, 409, 389, 390, 395, 400; 379/219-221; 340/825, 825.01, 825.02, 825.03, 826, 827; 359/110, 115, 124, 128, 127, 114, 119, 120, 139; 395/181, 182.01, 182.02

[56] References Cited

U.S. PATENT DOCUMENTS

| | | | |
|---|---|---|---|
| 5,128,789 | 7/1992 | Abramovitz | 359/128 |
| 5,128,926 | 7/1992 | Perlman et al. | 370/248 |
| 5,168,572 | 12/1992 | Perkins | 370/58.3 |
| 5,303,078 | 4/1994 | Brackett et al. | 370/60.1 |
| 5,307,342 | 4/1994 | Georgiou et al. | 370/58.1 |
| 5,319,485 | 6/1994 | Yasui et al. | 359/128 |
| 5,371,621 | 12/1994 | Stevens | 359/128 |
| 5,386,417 | 1/1995 | Daugherty et al. | 370/60.1 |
| 5,455,865 | 10/1995 | Perlman | 370/389 |
| 5,463,486 | 10/1995 | Stevens | 359/139 |
| 5,550,818 | 8/1996 | Brackett et al. | 370/60.1 |

*Primary Examiner*—Benedict V. Safourek
*Assistant Examiner*—Seema S. Rao
*Attorney, Agent, or Firm*—Perman & Green, LLP

[57] ABSTRACT

An efficient distributed technique for setting up, taking down, and updating connections in a communications network, which is robust in the presence of failures. More specifically with this invention a path for a connection is computed and reservation requests are simultaneously sent through separate channels to each of a set of nodes of the path for the connection to reserve and determine if resources are available for the connection. Upon acknowledgement that the links for the connection are available and have been reserved, a setup message is sequentially transmitted between the adjacent nodes along the path until the setup messages reaches the destination node. The switches in each node then configure themselves in response to the setup message so as to establish the connection.

10 Claims, 6 Drawing Sheets

| λ | PORT/LINK | LIGHTPATH ID | STATE |
|---|---|---|---|
| $\lambda_2$ | B,C | X,Y,$\lambda_2$,12 | UP |
|  | 1,D | A,Z,$\lambda_3$,12 | UP |
| $\lambda_3$ | C,F | X,Z,$\lambda_3$,10 | RESERVED |
|  | D,2 | V,A,$\lambda_3$,15 | UP |
|  | 3,E | A,U,$\lambda_3$,14 | RESERVED |

FIG. 4

| VP-TABLE($B_B$) | | | VC-TABLE($B_B$) | | | |
|---|---|---|---|---|---|---|
| next- | VPI | PORT | next- | VPI | VCI | PORT |
| 0 | 0 | * | * | * | * | * |
| * | * | * | 65 | 0 | 0 | $B_C$ |
| * | * | * | * | * | * | * |

| VP-TABLE($C_B$) | | | VC-TABLE($C_B$) | | | |
|---|---|---|---|---|---|---|
| next- | VPI | PORT | next- | VPI | VCI | PORT |
| 0 | 0 | * | 0 | 0 | 98 | $C_C$ |
| * | * | * | * | * | * | * |
| * | * | * | * | * | * | * |

FIG. 5

| λ | PORT/LINK | LIGHTPATH ID | STATE |
|---|---|---|---|
| $\lambda_2$ | B,C | | UP |
| | 1,D | | UP |
| | E,F | | UP |
| $\lambda_3$ | C,B | | UP |
| | D,2 | | UP |
| | F,3 | | UP |

SETTING UP, TAKING DOWN AND MAINTAINING CONNECTIONS IN A COMMUNICATIONS NETWORK

The invention herein was made with Government support under Contract MDA972-95-C-0075 awarded by the Advanced Research Projects Agency (ARPA). The Government has certain rights in this invention.

TECHNICAL FIELD

The present invention relates generally to communication networks. In particular it relates to a high-capacity telecommunications or data network realized by using optical wavelength division multiplexing (WDM) technology.

DESCRIPTION OF THE PRIOR ART

Figure 1:
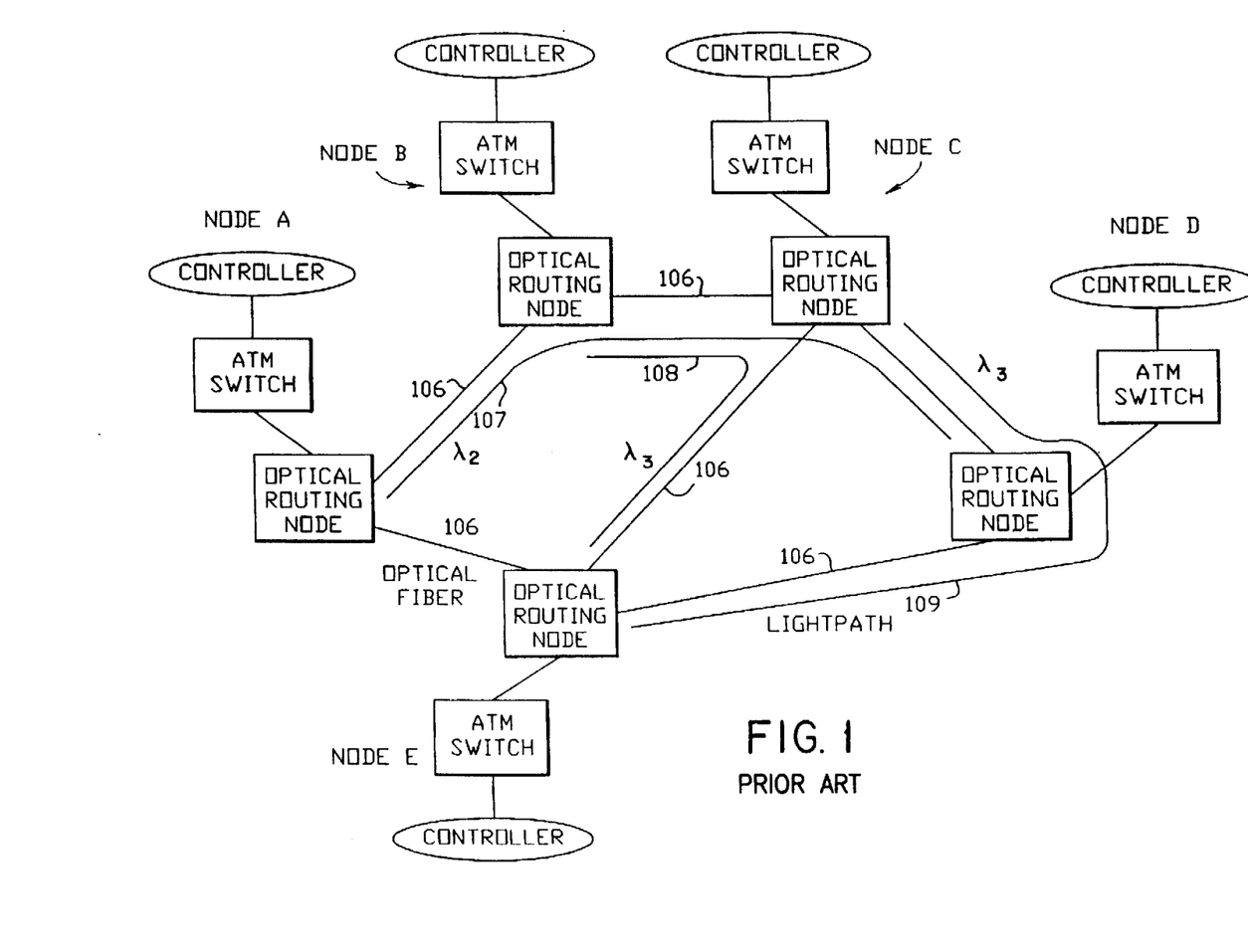
FIG. 1 describes the structure of an optical network consisting of optical wavelength-routing nodes interconnected by fiber links.

Optical WDM networks can provide enormous capacities (several hundred gigabits per second) to a large number of network users. In WDM the fiber bandwidth is split into multiple channels, each operating at a different optical wavelength. Each wavelength can carry data at gigabit-per-second rates. Such a network is shown in FIG. 1. The network consists of nodes (Nodes A–E) interconnected by fiber-optic links (106) in an arbitrary mesh topology. Each link carries traffic at several wavelengths. Each wavelength can be switched and routed independently of the others at each node. The network provides lightpaths (connections). A path is a set of links in the network that interconnect two nodes in the network. A lightpath is established on a particular wavelength and path through the network. In general a connection consists of a path in the network and some resources along each link in the path. In the case of a lightpath the resource is a wavelength. Two lightpaths that share a common fiber link must be assigned different wavelengths. Each lightpath can carry data at gigabit-per-second rates. For example in FIG. 1 lightpath 107 between nodes 101 and 104 is established on wavelength $\lambda_2$, lightpath 108 between nodes 102 and 105 is established on wavelength $\lambda_3$, and lightpath 109 between nodes 103 and 105 is established on wavelength $\lambda_3$ as well. This model assumes that a lightpath must be established on a single common wavelength along its entire path. However if the network contains wavelength converter devices, it may be possible to assign a different wavelength on each link to the lightpath.

In general the lightpaths terminate at a source and sink of data, for example electronic asynchronous-transfer-mode (ATM) switches. Depending on the requirements of the applications, such as the ATM switches, lightpaths may have to be setup and taken down over time.

In order to establish or takedown a lightpath, the switches in the routing nodes along the path of the lightpath must be configured. Further it must be noted that network elements such as the routing nodes, fibers between them etc. can fail. Thus it is desirable to perform this setup, takedown and updating the status of the network in a distributed manner.

There are known distributed methods for setting up, maintaining and terminating connections in conventional networks such as the internet [12], advanced peer-to-peer networks [3], ATM networks [9, 11], or telecommunication networks (U.S. Pat. No. 5,386,417 by Daugherty et al.).

Also known are specific centralized algorithms to determine a path and wavelength for a lightpath. For example, see [16, 8, 4, 2, 15, 5].

Prior art for setting up switches in a network remotely in response to messages is known. See for example, U.S. Pat. No. 5,189,414 by Tawara et al and the references below.

The notion of multicasting messages to multiple destinations is well established in the literature. For example U.S. Pat. No. 5,301,055 by Bagchi et al. discloses an algorithm that schedules time slots for multicast transmission inside a packet switch (as opposed to a network). Prior art teaches the notion of making rapid reservation for multiple network resources via a variation on multicasting. For example, in the plaNET high-speed network ([9, 10]), the controller at a source node wishing to reserve resources for a connection sends a message to the destination node along the path of the connection. This message is copied in hardware at the switches inside each intermediate node along the path and delivered to that node's controller. This hardware copy is very fast and allows this message to get through to all the controllers quickly. This technique cannot however be applied to optical networks and to other networks in general since the switches at the intermediate nodes do not have the hardware copy feature.

SUMMARY OF THE INVENTION

The present invention uses a substantially different technique for rapid reservations.

This invention proposes distributed methods to setup, takedown and update lightpaths. These methods work reliably and are robust in the presence of failures of various components in the network. The invention proposes the use of a controller associated with each routing node that is responsible for configuring the switches in that routing node. The setup, takedown and update procedures are then accomplished in a distributed manner by exchanging messages between the controllers according to specific protocols described in the embodiment. A rapid reservation procedure enables access to the resources needed to setup a lightpath efficiently and with high probability. The reservation procedure does not require the switches to have a copy feature, unlike the plaNET high-speed network [9, 10]. Once a lightpath is setup it remains in place even if controllers at the intermediate nodes fail. A lightpath may be taken down even if some controllers along the path of the lightpath are not operational. A controller upon recovering from failure obtains the correct status of the lightpaths flowing through its associated switch via the update procedure. The resources taken up by a lightpath are released when it is taken down by the takedown and update procedures.

The preferred embodiment assumes that the lightpaths terminate in ATM switches. It also assumes that controllers exchange messages between them, including the reservation and setup messages, using the existing ATM protocols [6, 1]. However the specific protocols proposed herein apply to networks having other termination points besides ATM switches and to other means of communication between the controllers as well.

Accordingly, this invention provides a method and apparatus for setting a lightpath in a communications network wherein a path comprising a set of links interconnecting a set of nodes to establish a connection between an originating and terminating node is computed. A plurality of reservation requests are simultaneously sent through separate channels to each node of the set of nodes to reserve and determine if links are available to establish the connection. Finally, upon receiving an acknowledgement that the links of the connection are available and have been reserved, a setup message is transmitted sequentially between adjacent nodes starting from the originating node to each node of the set of nodes along the path until the setup message reaches the destination node, where the setup message is transmitted between only two adjacent nodes at a time and where each node of the set of nodes changes its switch configuration response to the setup message so as to connect the links to establish the connection.

DESCRIPTION OF THE PREFERRED EMBODIMENT

The System

Figure 2:
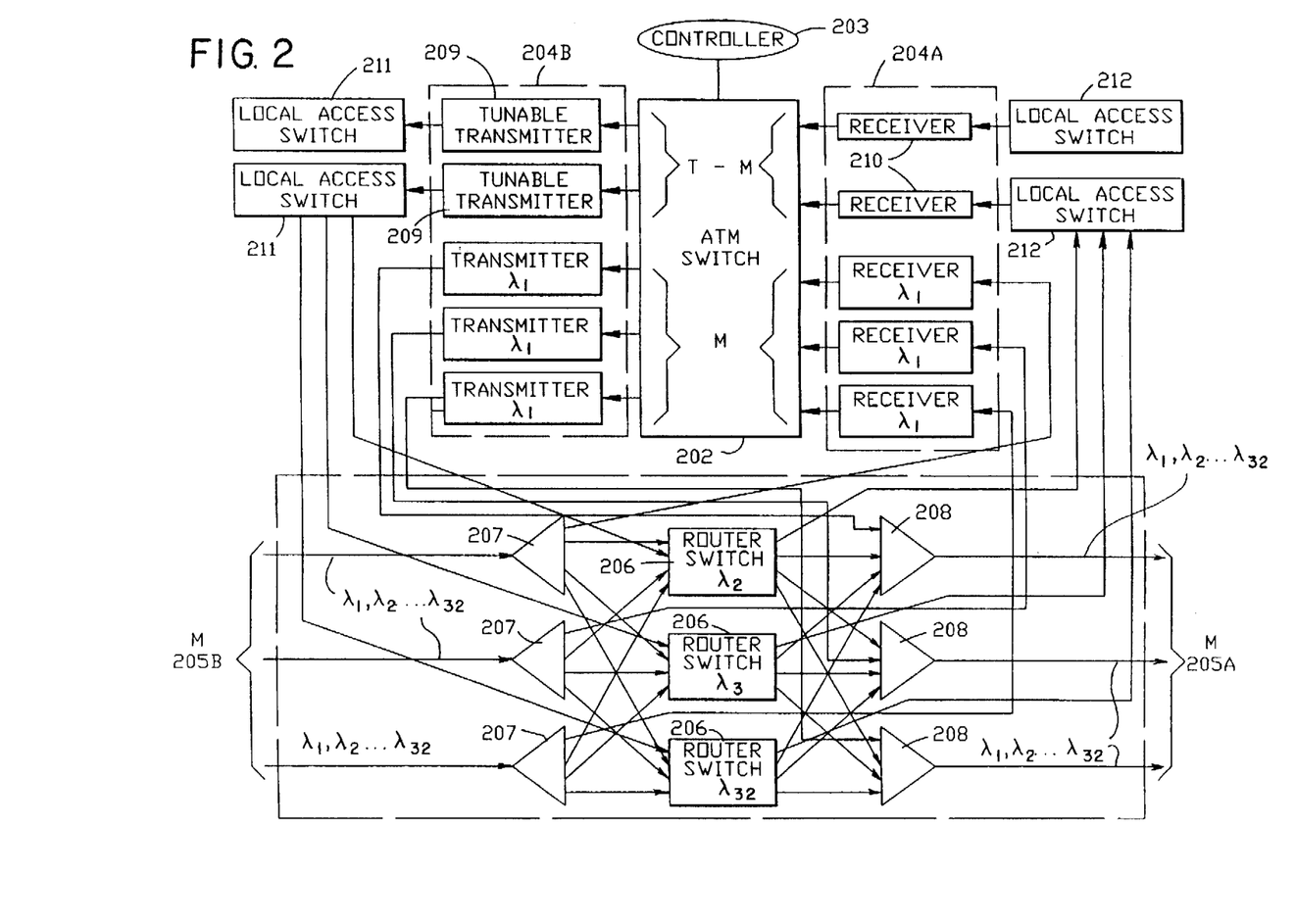
FIG. 2 describes the structure of one node in the network.

FIG. 2 illustrates an optical node (switching node) (101–105), consisting of the optical routing node (switch) 201, the associated ATM switch 202 with optical ports 204A, 204B on it, and the controller 203. A similar node structure is discussed in [7]. The controller communicates with other controllers in the network through the ATM switch (202) and using ATM virtual circuits, to be described below. The node is connected to M other nodes via the set of fiber links 205. Each of these M links (106) carries 32 wavelengths (in general W wavelengths). The optical routing node contains W−1 independent optical switches (206 in figure), referred to as router switches, one for each wavelength except $\lambda_1$. The router switch that handles wavelength $\lambda$ will be referred to as the $\lambda$ router switch. The controller (203) is responsible for configuring the router switches (206). Wavelength $\lambda_1$ is used for both control and data transmission and is treated differently than the others, as explained in the section on Control Connections. A wavelength demultiplexor (207) separates the signals onto different spatial ports so that each wavelength is directed to a different port. The inputs to the $\lambda$ router switch are all the signals at wavelength $\lambda$ on each of the M incoming links. Each output of the switch leads to a different wavelength multiplexor (208). This arrangement allows a signal at a particular wavelength on an input port to be routed to any output port, as long as no other signal at the same wavelength is being routed to the same output port.

If the ATM switch has T input ports (204A) and T output ports (204B), the node can source T lightpaths and sink T lightpaths. Out of these, there are M predefined lightpaths, all at wavelength $\lambda_1$, that will be discussed in the section on Control Connections. The remaining T−M sourced lightpaths can be directed out on any of the M fiber links (205A) connected to the node in any desired arrangement, provided that if two of these lightpaths share a link in the network they must be assigned different wavelengths. A similar arrangement is true for the T−M incoming lightpaths. In order to realize these lightpaths, the node is provided with T−M tunable transmitters (209) and T−M receivers (210). Each tunable transmitter (209), capable of sending at one of the W−1 wavelengths, is connected to an optical switch (211), referred to as a local access switch, that is set to guide the signal to the desired router switch (206). Specifically, if the transmitter connected to a local access switch is sending at wavelength $\lambda$, the switch is set to guide the signal to the $\lambda$ router switch. On the receiving side, we have T−M receivers (210). Each receiver is connected to a local access optical switch (212), which selects a signal from one of the router switches (206) to send to the receiver (210). Specifically, if the receiver (210) connected to a given port of the ATM switch is supposed to receive the $\lambda_2$ signal, the corresponding local access switch (212) is set to select the signal coming from the $\lambda_2$ router switch (206).

Three Levels of Connections

In all-electronic ATM networks, two levels of connections are defined [6]: Virtual Path (VP) connections and Virtual Channel (VC) connections. The building blocks of the former are the physical links of the network, the building blocks of the latter are the VP's. ATM cells are sent on VC's, and several (typically many) VC's are bundled together into one VP. All VC's that use a particular VP are packaged into the VP at one end, their cells travel together over the VP and at the other end of the VP, they are unpacked and forwarded separately to their respective next VP or to the user via the AAL layer.

An ATM network with an underlying optical layer can be viewed similarly, except that there are three levels of connections: lightpaths, VP's and VC's. The building blocks of the lightpaths are the physical optical fiber links, the building blocks of the VP's are the lightpaths, and the building blocks of the VC's are the VP's. The lightpaths are switched by the optical routing node without being converted back into electronic form. All VP's that use a particular lightpath are packaged into the lightpath, and their cells travel optically over the lightpath. At the other end of the lightpath, they are converted to an electrical signal and forwarded together to the ATM switch. The ATM switch decides whether the cell should be forwarded to the next lightpath on the same VP or on a different VP.

Lightpaths terminate at a port on the ATM switch, VP's terminate at the port of the ATM switch and VC's terminate at the user of the ATM switch. The fastest propagation of data through a node occurs if the signal travels on a lightpath, in which case it is handled and routed optically in the optical routing node. Next in speed of propagation through a node is a signal that arrives to the end of a lightpath, but continues on the same VP it has arrived on, on the next lightpath. In this case, the signal is converted to electrical and back to optical and is handled by the ATM switch. Slightly slower propagation occurs if the cell is at the end of the VP, and continues on the same VC, but on a new VP. In this case, the signal is converted and handled by the ATM switch as in the previous case, but the switch needs to examine both the VP and the VC tables. In all previous cases, the controller is not involved in the transmission of data. Sometimes the controller must however be involved. For example if it must receive a control message, process it and transmit a new control message to the next controller on a path, the transfer of data is significantly slower than in other cases. Therefore in time critical procedures, one should avoid involving intermediate controllers in the transmission.

Lightpath Switch Table (LST)

Every lightpath is identified by a lightpath-id that consists of a quadruple (originator, destination, wavelength, sequence number). Two different lightpaths may carry the same sequence number if they have different originators, destinations or wavelengths. The lightpath-id is assigned by the originator and we assume that the sequence number contains enough bits so that no wrap around occurs. This means that in our protocol we can assume that once a lightpath-id quadruple is assigned, it will never be reassigned to another lightpath (in practice, it may be reassigned a very long time after the previous one was taken down, long enough to ensure that there is no trace of the old lightpath in the entire network). The lightpath-id is carried in all control messages related to the lightpath.

Figure 3:
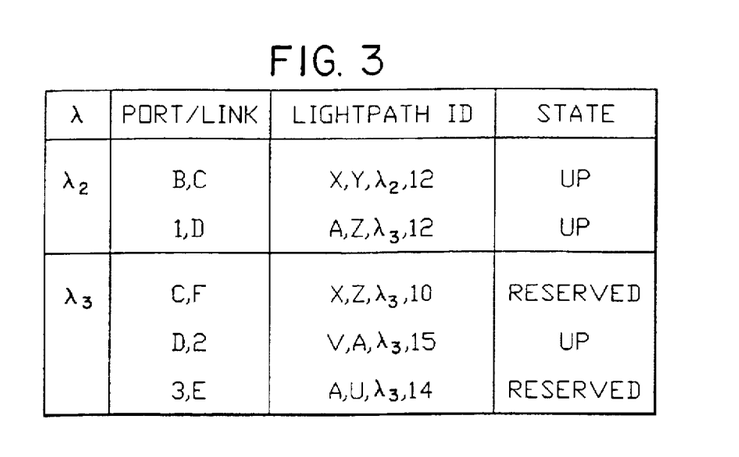
FIG. 3 shows the contents of a lightpath switch table at a given node.

The controller keeps a lightpath switch table (LST) that indicates the settings of its optical switches, the lightpath-id of the lightpaths that use them and their state. An example of such a table for wavelengths $\lambda_2$, $\lambda_3$ at a node A whose neighbors are B, C, D, E, F, is given in FIG. 3. The entries correspond to:

- a $\lambda_2$ lightpath with id X, Y, $\lambda_2$, 12 (originator=X, destination=Y, sequence number=12) that uses links (A, B) and (A, C).
- a $\lambda_2$ lightpath with id A, Z, $\lambda_2$, 12 that uses Port 1 at the ATM switch at A and link (A, D).
- $\lambda_2$ is not in use on links (A, E) and (A, F) and therefore E and F do not appear in the link/port column for wavelength $\lambda_2$.
- a $\lambda_3$ lightpath with id X, Z, $\lambda_3$, 10 that uses links (A, C) and (A, F) that is being set up.
- a $\lambda_3$ lightpath with id V, A, $\lambda_3$, 15 that uses link (A, D) and Port 2 of the ATM switch at A.
- a $\lambda_3$ lightpath with id A, U, $\lambda_3$,14 that uses Port 3 at A and link (A, E) that is being set up.
- $\lambda_3$ is not in use on link (A, B).

Definition 1

Related entries in the LST's of two neighboring controllers are entries of the same wavelength that point to the link connecting them. For example, for two neighboring controllers A and B, an entry $\lambda_2$, (C, B) that points to link (A, B) for wavelength $\lambda_2$ in the LST of controller A is related to an entry $\lambda_2$, (A, D) in the LST at controller B.

Figure 5:
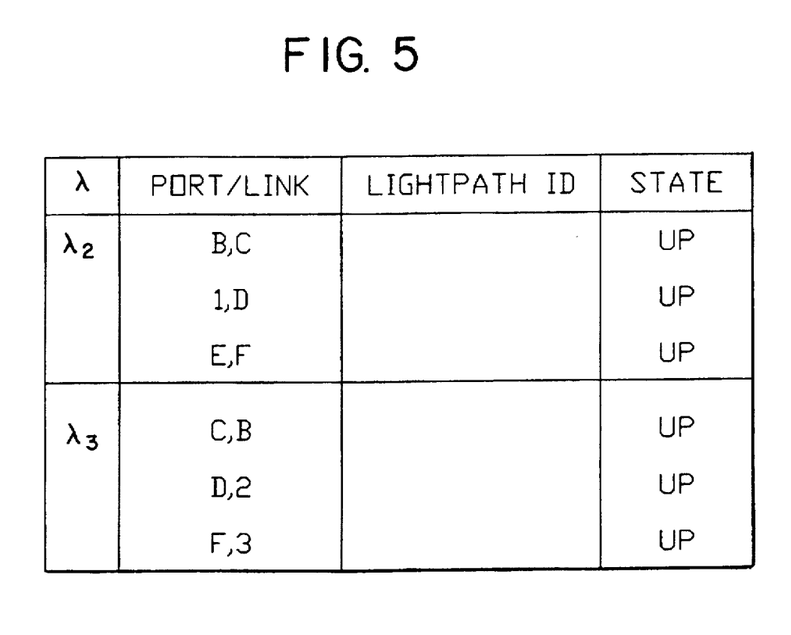
FIG. 5 explains the notion of permanent virtual paths and permanent virtual circuits.

If a controller goes down, it normally loses its LST. When it comes back up, it initializes its table by reading the current switch settings in its optical routing node. It includes in the LST in state up <B4>[1] those router switch ports that are connected to other ports. The LST will be updated using a LST update protocol as described in the section on Takedown and Update. For example, consider the controller at node A with LST as in FIG. 3. As we shall see later, the router switches are set only when the lightpath goes to state up. For those in other states, the switches may be set according to old lightpaths that have already been taken down. For example, suppose that Port 3 of the ATM switch is connected to link (A, F) on $\lambda_3$, link (A, C) is connected to link (A, B) and link (A, E) is not connected. Also, on $\lambda_2$, link (A, B) is connected to (A, C), Port 1 is connected to (A, D) and (A, E) is connected to (A, F). In this case, if the controller goes down, when it comes back up, it initializes the LST as in FIG. 5.

[1] The notation <•> refers to the corresponding line in the algorithm code of the section on The Code.

When an optical routing node recovers from failure, its router switches are set randomly. In order to indicate to the controller (that might also be down or go down) that the router switch settings were not set up by a previous lightpath setup procedure, we use status bits. To every port of each router switch, we attach a status bit that is part of the optical routing node, but is reset by the controller. An optical routing node recovers from failure with all status bits set to 1 (<A2>). When a port is actually connected to another port for the use of the lightpath during the lightpath setup procedure to be described in the section on Setup, the controller resets the corresponding status bits of those ports to 0. A controller that recovers from failure disregards router switch settings that connect ports with status bits set to 1. The status bits are also used in case of partial failure of the optical wavelength router. If a router switch fails, it recovers with status bits corresponding to its ports set to 1.

Control Connections

Each ATM switch has ATM signaling capabilities implemented by a Signaling ATM Adaptation Layer (SAAL) assumed to work according to Draft ITU-T Recommendation Q.SAAL.0 [1]. The control of the ATM switch, in particular setting up the VCI and VPI tables, is performed by the Signaling Network Layer in the ATM switch. To simplify the discussion here, we shall refer to the Controller in the node to include both the Optical Routing Node Controller and the Signaling Network Layer.

In order to set up, take down and manage lightpaths, the controllers must communicate via messages such as reservation requests, setup messages. Communication in ATM takes place on VC's. This creates a chicken-and-egg problem: in order to set up lightpaths, the controllers need VC's, but in order to set up VC's we need VP's which in turn need lightpaths. The problem can be solved by using predefined lightpaths (P-lightpath), predefined VP's (P-VP) and predefined Signaling VC's (PS-VC), similar to what was proposed in [11] for all-electrical ATM networks. On each link in the network, we shall predefine a P-lightpath, a P-VP and an S-VC, all of which are one-hop and are set up without communication. The P-lightpath will carry the P-VP for that link, but can also carry other VP's (the latter may consist of one or more links). Similarly, the P-VP will carry the PS-VC, but may also carry additional VC's, for instance data transmission VC's. The PS-VC's allow controllers at neighboring nodes to communicate in order to set up other lightpaths.

In order to realize the P-lightpaths, we select one wavelength in the entire network, say $\lambda_1$, over which those lightpaths will be established, each at the time when the corresponding link is brought up. In the ATM switch, we designate M output ports and M input ports, where M is the number of neighbors of the node, to serve the P-lightpaths (see FIG. 2). To each such port we connect a $\lambda_1$-fixed-wavelength transmitter or receiver that connects directly into the optical multiplexor/demultiplexor that handles the corresponding fiber link. In this way we realize the P-lightpath without need for communication between its endpoints.

Routing of VP's and VC's is done by label swapping. The labels are normally referred to as identifiers, VPI and VCI respectively. Each port processor in the ATM switch contains a VPI table and a VCI table. The fields of an entry in the VPI table are (next-VPI,next-port). When a cell comes in, the processor looks in the entry corresponding to the VPI carried in the cell header, swaps the VPI with next-VPI and forwards the cell via the switch to next-port. A given next-VPI, say 0, is designated to indicate that for this cell, the node is the endpoint of a VP. When the port processor reads value 0 in the next-VPI field, it does not look in the next-port field, but rather examines the VCI table, in the entry corresponding to the VCI carried in the cell header. The fields of the VCI table are (next-VPI,next-VCI,next-port). The VPI,VCI in the cell header are swapped with next-VPI,next-VCI and the cell is forwarded to next-port via the switch. If the next-VPI field is 0 and the next-port field contains the port corresponding to the local higher level, it means that this is the endpoint of the VC. In this case, the next-VCI field indicates the local Adaptation ATM Layer (AAL) process that handles this call.

Figure 4:
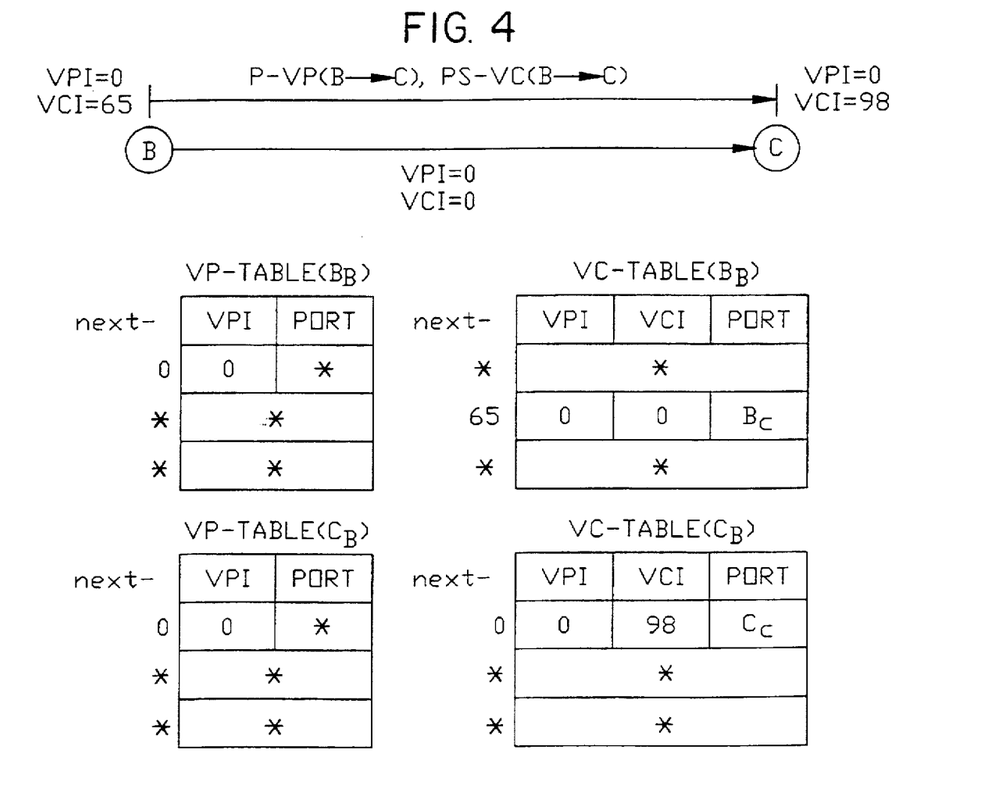
FIG. 4 shows the contents of a lightpath switch table at a given node after its controller fails and recovers.

Just as $\lambda_1$ is preassigned for the one-hop lightpath, we preassign the VPI-VCI pair (0,0) carried in the cell header to indicate that this cell belongs to the P-VP and PS-VC. FIG. 4 illustrates how P-VP(B→C) and PS-VC(B→C) (corresponding to the link from B to C) can be established without communication. In FIG. 4, $C_B$ denotes the port in the ATM switch at C that handles cells coming from the link (B,C) and $B_B$ denotes the port that handles cells coming from the local AAL. Every cell received by C on link (B,C) with VPI=0 and VCI=0 belongs by definition to P-VP (B→C) and PS-VC(B→C). The predefinition of P-VP (B→C) and PS-VC(B→C) requires only local operations at nodes B and C, without any communication between them. This is done in the following way. Node B writes 0 in the next-VPI field of VP-Table($B_B$), selects an available entry, 65 say, in VC-Table($B_B$), sets VC-Table($B_B$)|65|←(0, 0, $B_C$) and creates an AAL process AAL($B_{65}$) for PS-VC(B→C). Independently, node C writes 0 in the next-VPI field of VP-Table($C_C$), selects an available entry, 98 say, in VC-Table($C_C$), sets VC-Table($C_C$)|98|→(0, 0, $C_B$) and creates an AAL process AAL($C_{98}$) for the same PS-VC.

The Topology Update Protocol

In order to set up new lightpaths, the controllers need to know the topology of the network and the usage of wavelengths on the network links. To this end, we employ a topology update protocol, similar to the ones used in networks such as the ARPANET |13| or the plaNET high-speed network |9|.

We will use a periodic topological update procedure in which each node periodically broadcasts pertinent topology information to all the other nodes <B3>. The broadcast can be done either by flooding or on a spanning tree if one is maintained for this purpose. We shall assume that there is some mechanism, either sequence numbers or timestamps, that provides ordering information about update messages originating at a node.

The information in the topological update messages is generated from the node LST. A topological update message contains the list of up links adjacent to the node and their wavelength usage. The latter includes lightpaths that are up or being set up. For example, node A with the LST of FIG. 3 generates update message (B, $\lambda_2$), (C, $\lambda_2$, $\lambda_3$), (D, $\lambda_2$, $\lambda_3$), (E, $\lambda_3$), (F, $\lambda_3$).

Every node in the network maintains a topology database that reflects its knowledge of the nodes that are up, the highest timestamp of update messages received from each such node, the links that are up next to each node and their wavelength usage. Whenever a node receives an update message about another node with a later timestamp than the stored one, it updates the corresponding information and propagates it by sending the update message to all neighbors <E1>–<E4>. The topology information is used by nodes to decide the path of a new lightpath it intends to establish.

The Lightpath Update Procedure (LST Update)

If a controller goes down, it loses its LST. After it comes back up, the status of the lightpaths that may go through its optical wavelength router must be updated. To this end we employ a LST update procedure. Periodically (when UPDATE-TIMER expires) and whenever there is a change in the LST <C1>, each controller sends separately to each neighboring controller a list of the wavelength, id and state of all lightpaths that go over the link connecting them <C2>. For example, controller A with LST as in FIG. 3 sends to C the message (($\lambda_2$, (X, Y, $\lambda_2$, 12), up), ($\lambda_3$, (X, Z, $\lambda_3$, 10), reserved)). To neighboring controller D it sends the message (($\lambda_2$, (A, Z, $\lambda_2$, 12), up), ($\lambda_3$, (V, A, $\lambda_3$, 15), up)). The actions taken by the neighboring controllers upon receiving the message will be described in the section on Takedown and Update.

Setting Up Lightpaths

The operations that need to be performed in order to establish a new lightpath between two nodes are the following:

Wavelength and Route Determination
  The originator node finds a path with an unused wavelength. This can be deduced from the topology database and wavelength usage database, both of which are updated by the topology update protocol. Path computation algorithms that can be used for this purpose are described in |8, 15|.

Reservation
  The originator node requests all controllers on the lightpath to reserve the selected wavelength on all links of the path. This stage is necessary because the number of wavelengths is limited, say 32, and without it there might be several independent attempts to use the same wavelength on some link, that will collide and none will be successful. In order to reduce the chance of collision of the reservation processes, this stage must be performed at maximum speed.

Lightpath setup/release
  If the reservation step is successful at all nodes in the path, router switches are set by the corresponding controllers to accomplish the lightpath. Otherwise, the reservation is released at all nodes at which it was accomplished. Router switch settings do not change upon reservation or release.

Figure 6A:
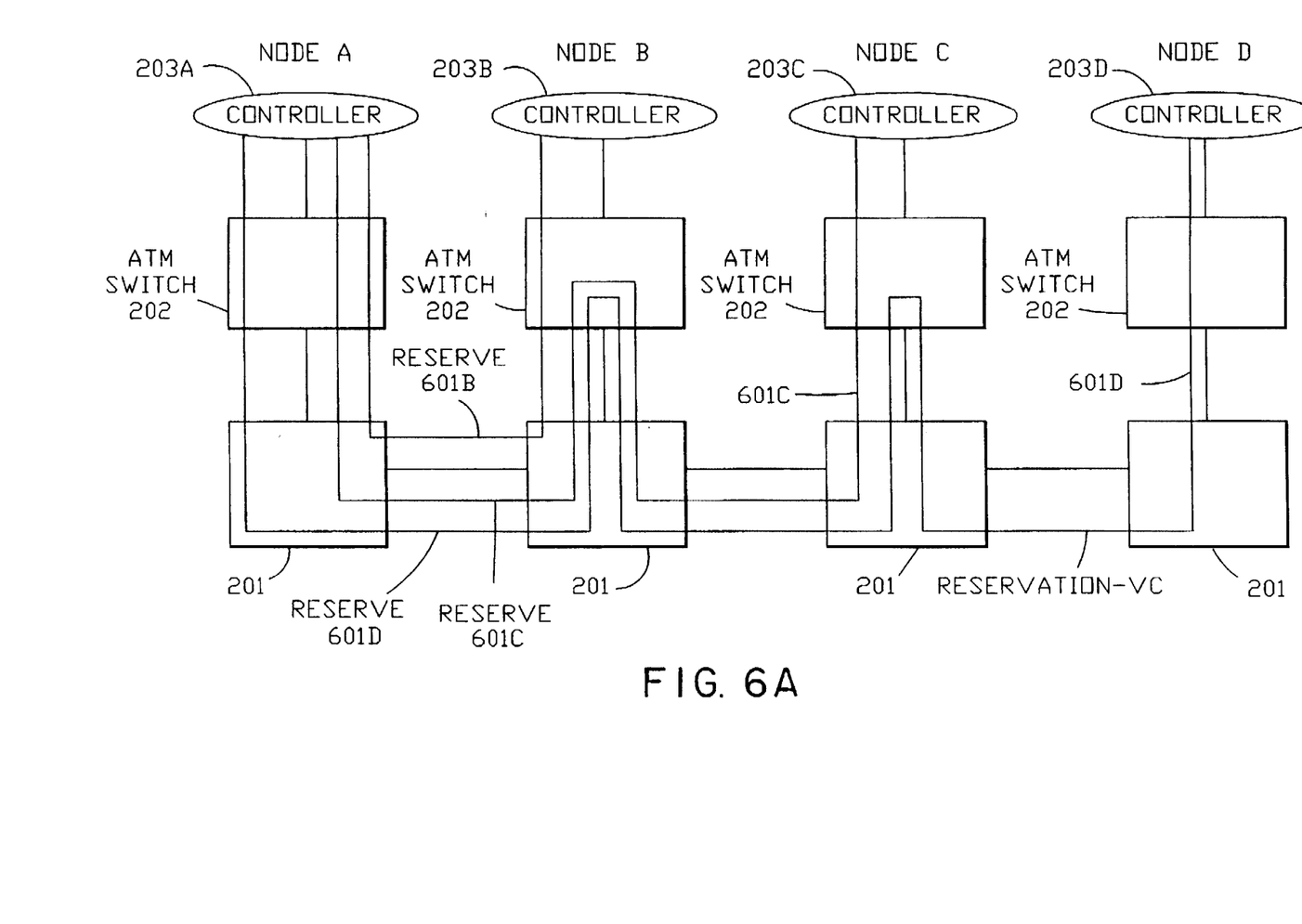
FIGS. 6A and 6B describe the lightpath setup protocol.
Figure 6B:
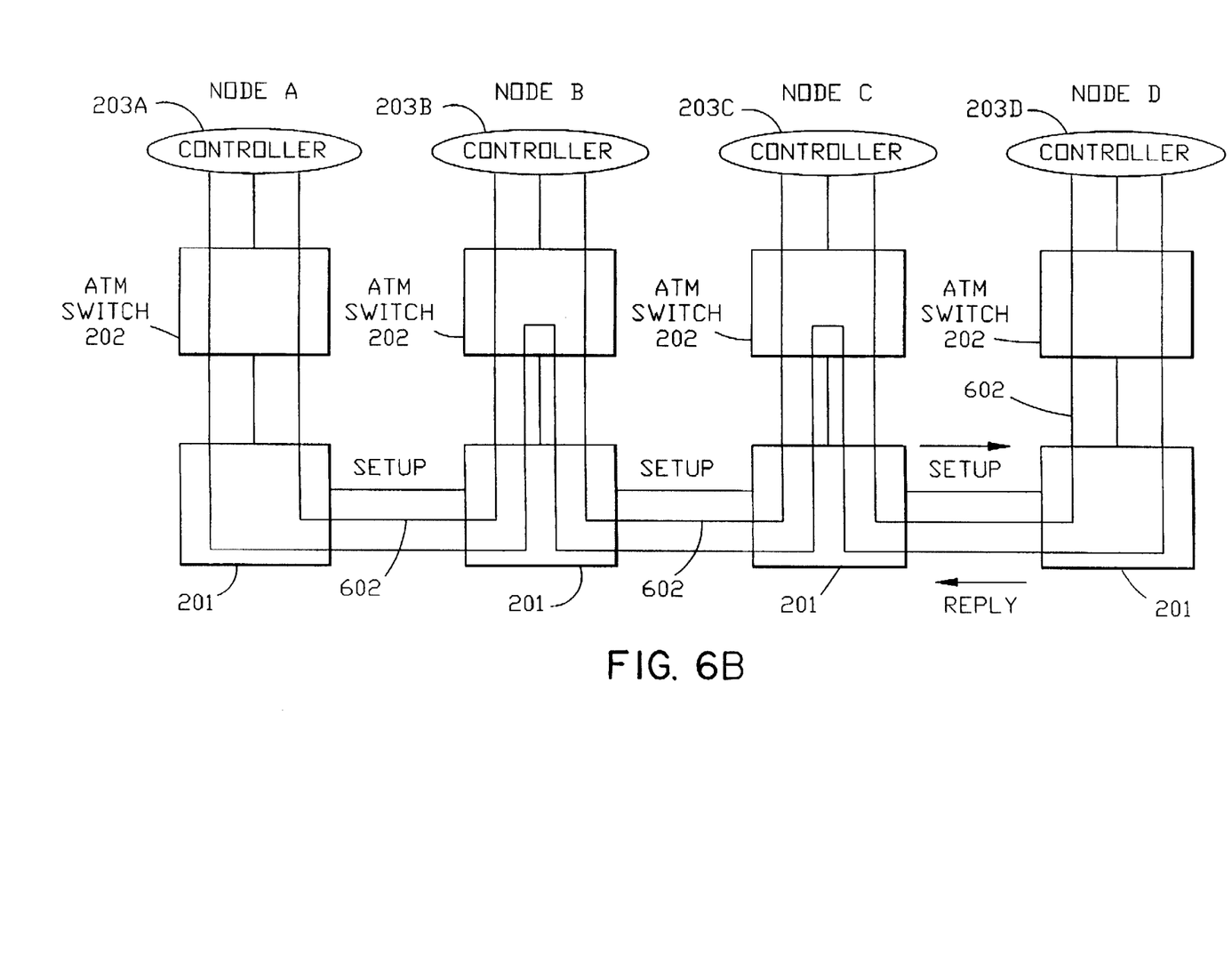

We propose the following reservation protocol (see FIGS. 6A and 6B). The controller (203A) at the originator node (node A) establishes a VC to each of the controllers (203B, 203C, 203D) of the nodes of the lightpath, a separate VC to each controller (see FIG. 6(a)). The VC's (601B, 601C, 601D) are established over the P-VP's (not shown). We shall use the term reservation-VC's to refer to these VC's. On these VC's the originator can perform a preliminary check to find out whether indeed the wavelength is still available on the selected path. After obtaining whatever information it needs, the originator controller triggers the reservation procedure, by sending a RESERVE message <G6> for the wavelength on the intended path, simultaneously on all reservation-VC's (channels). Note that although the setup of the reservation-VC's and the gathering of information may take some time, the RESERVE messages travel on the reservation-VC's and do not use interim controllers. In this way, we minimize the probability that this process will collide with another reservation process that may attempt to reserve the same wavelength on one or more links of the path. Each controller on the path sends a positive (RESERVE-ACK) or negative (RESERVE-NACK) response to the originator <H5>,<H8>. If the reservation is successful, a corresponding entry is included in the LST in state reserved <H6>. No router switch settings are changed at this point, since there is no point in setting the switches unless it is known that all reservations were successful. The controller uses the RESERVE-TIMER <H4> in state reserved and deletes the entry if the timer expires before it receives the SETUP message <N2>.

If the reservation was successful at all nodes, then the setup procedure, described below (see FIG. 6(b)), is started. The reservation may not be successful at all nodes even if the wavelength was available on all links at the time when the preliminary check was performed. This may happen if some of the controllers have in the interim received and accepted another reservation request for the same wavelength on one or more of the links of the path. In this case, the originator instructs all controllers, by TAKEDOWN messages sent over the reservation-VC's <J2>, to release the reservation.

The setup procedure cannot be performed on the reservation-VC's because loops of reserved wavelengths may occur that will never be released (see Lemma 2). Another reason that the setup must be performed sequentially is that the last controller on the path must be the last to setup the switches. This is because once the last controller on the path receives the setup message, the node is allowed to start sending data on this lightpath. Therefore, if the reservation procedure was successful at all nodes, the originator starts a chain of SETUP messages (602) <I3> (see FIG. 6(b)), that travel from one controller to the next on the path, on the PS-VC's. When a controller receives a SETUP message <K1>, if the LST contains an entry in state reserved with the same lightpath-id <K2>, it sets up the router switch for the appropriate wavelength to be used by the lightpath, updates the status bits as explained below, puts the entry into state up and sends a SETUP message to the next controller on the path.

To be specific, consider the controller at node A that is supposed to connect ports B and C at the λ router switch for use of the lightpath. Suppose that beforehand port B is connected to port D and port C to port E, both connections being unused. Setting the router switch means connecting ports B and C. At the same time, ports D and E will be connected to some other unused ports in the switch, possibly to each other.

Definition 2

The connection between ports B and C above will be referred to as a connection between solidly connected ports. The connection between ports D and E above will be referred to as a connection between spuriously connected ports.

When the router switch is set up, the status bits corresponding to solidly connected ports are reset to 0 and the status bits corresponding to spuriously connected ports are set to 1 (<I6>, <I7>, <K5>, <K6>).

If the SETUP message makes it all the way to the destination controller, the latter sends a REPLY message to the originator on the reservation-VC <K9>. The originator node and destination node on the path can start using the lightpath when they receive respectively the REPLY and the SETUP messages.

Takedown and Update

If a lightpath is not needed anymore or if a link or an optical routing node on the lightpath fails, the lightpath should be taken down and its resources released. A lightpath can be taken down intentionally only if there are no VP's, and therefore no VC's, that use that lightpath. From the control point of view, taking down a lightpath means updating the LST's at all controllers along the lightpath by deleting the corresponding entry. The router switch settings in the optical routing node remain the same until they are needed for a new lightpath.

We employ two procedures for taking lightpaths down, explicit TAKEDOWN messages and LST update. When there are no exceptions, either one will take the entire lightpath down. Each procedure handles a different scenario of exceptions.

The first procedure calls for the originator controller to send a TAKEDOWN message on each reservation-VC to each controller on the lightpath <P1>. Upon receiving the TAKEDOWN message, each controller deletes the entry corresponding to the lightpath in its LST <R2>. The property of this procedure is that, even if some controllers on the lightpath are down, it takes down the lightpath at all working controllers that are connected to the originator. However, if the originator is down, the lightpath cannot be taken down by this procedure. Also, if a link or an optical routing node is down, there is no reservation-VC to controllers beyond the failed link, so again at these controllers the lightpath cannot be taken down by TAKEDOWN messages.

The second procedure is LST update, whereby periodically (when UPDATE-TIMER expires) and whenever there is a change in the LST <C1>, each controller sends separately to each neighboring controller a list of the wavelength, id and state of all lightpaths that go over the link connecting them <C2>. When a controller receives the LST update message from a neighbor, it scans the entries in the local LST that point towards the link to that neighbor and looks for related entries in the received LST. If for a given entry in the local LST there is no related entry in the received one, the entry in the local LST is deleted <D4>.

The LST update procedure has the property that if any controller on the lightpath deletes the entry corresponding to a lightpath, the appropriate entries will be deleted at all controllers along the lightpath until the procedure meets a failed controller or the end of the lightpath. If a link or an optical routing node fails, both ends of the lightpath will detect loss of light and will delete the entry in the LST at the controllers. In addition, the controllers next to the failure will delete the entry corresponding to all lightpaths that have traversed the failed link/router <F2>. Then the LST update procedure will ensure that the entries corresponding to the lightpath will be deleted along the lightpath. Similarly, if the originator controller fails and the other end wants to take down the lightpath, it will simply delete the appropriate entry.

Note that since transmission of data on a lightpath does not employ the controller or the ATM switch at intermediate nodes, failure of a controller or of an ATM switch after the lightpath is established does not require taking down the lightpath. Since the LST is lost upon the failure of the controller, when the controller comes up again, it assumes that the router switch settings connecting ports with status bit=0, correspond to lightpaths that are up <B4>, <B5>. If the lightpath is in fact not up, the controller will learn about this via the LST update procedure.

In order to deal with the case when all controllers along a lightpath fail and then recover, the endpoints of a lightpath have a timer (IDLE-TIMER) that runs while receiving idle characters; if the timer expires, the entry corresponding to the lightpath is deleted <O2>, thereby triggering the deletion of entries at all other controllers via the LST update procedure.

While in reserved state, the controller does not change the state of the entry in response to received LST updates <D3>. This prevents a controller from taking the reservation down in the case when it has reserved a wavelength while its neighbor is slow and has not done so yet. The RESERVE- TIMER runs in reserved state to ensure that the reservation is released if the lightpath is not set up within reasonable time. The expiration time of the RESERVE-TIMER should be set such that it allows the reservation phase to finish at all nodes on one hand, while it allows cancelation if the setup process does not complete successfully within reasonable time.

An additional case that has to be studied is when there is a failure of a controller while a lightpath is in reserved state at that controller. In this case, the lightpath will not be set up and the reservations must be released. This is done again by the RESERVE-TIMER expiring at controllers that do not receive the SETUP message <N2>. Also all entries corresponding to a link are deleted if the link or adjacent optical routing node fail <F2>. The LST update procedure ensures in both cases that the entries will be deleted along the lightpath.

The Code

The following code, reflecting the previous informal description of the protocol, is executed by each controller in the network.

```
Protocol Manage
Messages
LST - Lightpath Switch Table - each entry contains (wavelength, id, state)
SETUP(id, path)
TAKEDOWN(id)
RESERVE(id, λ)
Variables
id - lightpath - id
LST - lightpath switch table
state(entry) - state of an entry
state(id) - state of an entry with a given lightpath-id
entry(id) - entry with a given id
status bit - for each port in the router and local access switches
Initialization
- setup P-lightpaths, P-VPs and PS-VCs
- initialize LST to empty
- initialize topology database entries to list of adjacent links and no reserved lightpaths.
- start UPDATE-TIMER
```
*Algorithm for each controller*
*Actions related to all lightpaths*
```
A1          event: optical wavelength router comes up
A2              all status bits = 1
A3              delete all entries in LST
B1          event: controller comes up
B2              corresponding to each switch setting with status bit = 0
B3                  send local topology update
B4                  enter entry in LST
B5                  state(entry) = up ; id(entry) = empty
B6                  if switch setting points to local port: start IDLE-TIMER(entry)
C1          event: UPDATE-TIMER expires or change in LST
C2              send LST update
C3              start UPDATE-TIMER
D1          event: LST received from adjacent controller
D2              for each entry x in local LST that points to the link to the adjacent controller
D3                  if state(x) = up and received LST does not contain related entry
D4                      delete entry x
E1          event: topology update received
E2              if timestamp higher than stored one
E3                  update link utilization information
E4                  forward topology update
F1          event: loss of light on P-lightpath (adjacent link or optical wavelength router fails)
F2              delete all entries in LST that use the link
```
*Actions related to a given lightpath id*
```
G1          event: lightpath setup request from higher layer (originator)
G2              determine route and wavelength λ
G3              setup reservation-VC's with each controller along route
G4              if all reservation-VC's are successfully set up
G5                  assign entry and id
G6                  send RESERVE(id,λ) on each reservation-VC
G7                  state(id) = reserved
G8                  start RESERVE-TIMER(id)
H1          event: RESERVE(id,λ) received
H2              if λ available on corresponding link (no entry in LST)
H3                  select entry and record id
H4                  start RESERVE-TIMER(id)
H5                  send RESERVE-ACK(id)
H6                  state(id) = reserved
H7              else
H8                  send RESERVE-NACK(id)
I1          event: RESERVE-ACK(id) received (originator)
I2              if all RESERVE-ACK(id)'s received and state(id) = reserved
I3                  pass SETUP(id) to the next controller
I4                  state(id) = up
I5                  set router and local access switches
I6                  status bits corresponding to solidly connected switch ports = 0
```

| | |
|---|---|
| I7 | status bits corresponding to spuriously connected switch ports = 1 |
| I8 | start SETUP-TIMER(id) |
| I9 | cancel RESERVE-TIMER(id) |
| J1 | event: RESERVE-NACK(id) received |
| J2 | send TAKEDOWN(id) messages over reservation-VC's |
| J3 | delete entry(id) |
| K1 | event: SETUP(id) received |
| K2 | if state(id) = *reserved* |
| K3 | state(id) = *up* |
| K4 | set router switch |
| K5 | status bits corresponding to solidly connected switch ports = 0 |
| K6 | status bits corresponding to spuriously connected switch ports = 1 |
| K7 | if destination |
| K8 | set local access switch |
| K9 | send REPLY(id) to originator over reservation-VC |
| K10 | start IDLE-TIMER(id) |
| K11 | start using lightpath |
| K12 | else |
| K13 | pass SETUP(id) to next controller |
| K14 | cancel RESERVE-TIMER(id) |
| L1 | event: REPLY(id) received ( originator ) |
| L2 | start using lightpath |
| L3 | cancel SETUP-TIMER(id) |
| L4 | start IDLE-TIMER(id) |
| M1 | event: message received on lightpath(id) |
| M2 | restart IDLE-TIMER(id) |
| N1 | event: RESERVE-TIMER(id) expires |
| N2 | delete entry(id) |
| N3 | originator: send TAKEDOWN(id) messages over reservation-VC's |
| O1 | event: IDLE-TIMER(id) expires (originator or destination) |
| O2 | delete entry(id) |
| O3 | originator: send TAKEDOWN(id) messages over reservation-VC's |
| P1 | event: lightpath takedown request from higher layer ( originator or destination ) |
| P2 | delete entry(id) |
| P3 | originator: send TAKEDOWN(id) messages over reservation-VC's |
| Q1 | event: loss of light on lightpath(id) (originator or destination) |
| Q2 | delete entry(id) |
| Q3 | originator: send TAKEDOWN(id) messages over reservation-VC's |
| R1 | event: TAKEDOWN(id) message received |
| R2 | delete entry(id) |

Properties of the Control Procedures

Below is a set of theorems that demonstrate the reliable, failsafe operation of the invention. Recall that we have assumed earlier that the lightpath-id is unique and no two lightpaths carry the same id.

Definition 3 a) A router switch setting is said to belong to the lightpath for which the setting was set.

b) An entry in state up is said to correspond to the router switch setting that has been set when the entry entered up (<I5>, <K4>) or to the router switch setting for which the entry was entered in the LST when the controller came up (<B4>). A router switch setting is also said to correspond to the switch ports that are connected by the switch setting.

Lemma 1 (Preliminary Properties)

Consider a given lightpath with a given id and a given selected route. For the given lightpath a) at most one RESERVE(id) message arrives at each controller.

b) each controller can be in reserved state at most once.

c) at most one SETUP(id) message arrives at each controller.

d) an entry in state up always contains the correct corresponding router switch setting.

e) if an entry is in state up, the status bit at the corresponding switch ports is 0.

Theorem 1 (Successful Setup)

Suppose that a controller receives a lightpath setup request from the higher layer. Suppose that a route is found and no failures of links, switches or controllers occur along the route for sufficiently long time. Suppose that in addition no other originator reserves the same wavelength on one of the links of the route before the considered controller does. Then:

a) the wavelength is successfully reserved at all controllers along the lightpath (state(id)=reserved).

b) if, in addition no RESERVE-TIMER expires, the lightpath is set up at all controllers along the lightpath (state(id)=up).

c) if in addition, the SETUP-TIMER at the originator does not expire, both the originator and the destination will start using the lightpath.

Definition 4 a) A linear lightpath section is a path of router switches on a given wavelength $\lambda$ at nodes $A_1, A_2, \ldots, A_n$ such that: the $\lambda$ router switch at $A_i$ connects $A_{i-1}$ to $A_{i+1}$ for i=2, ..., (n−1)

the $\lambda$ router switch at $A_1$ connects $A_2$ either to the local access switch at $A_1$ or to some node $A_0$ whose $\lambda$ router switch is not connected to the $\lambda$ router switch at $A_1$.

the $\lambda$ router switch at $A_n$ connects $A_{n-1}$ either to the local access switch at $A_n$ or to some controller $A_{n+1}$ whose $\lambda$ switch is not connected to $A_n$.

b) A loop lightpath section is the same as a linear one, except that the $\lambda$ router switch at $A_1$ connects $A_2$ to $A_n$ and the $\lambda$ router switch at $A_n$ connects $A_{n-1}$ to $A_1$.

Lemma 2 (Loop Freedom)

There are no loop lightpath sections with all corresponding status bits=0.

Corollary: There are no loop lightpath sections with corresponding LST entries in state up.

A possible alternative may be to send the SETUP message in parallel on the reservation-VC's instead of sequentially from controller to controller. With this alternative however, if controllers fail and recover, it is easy to construct a case where a loop with status bits=0 can be formed with all controllers in state up. If such a loop is formed then it will never be broken.

Definition 5

A lightpath is said to be up if it has been set up successfully and its endpoints are using it.

Theorem 2

If a lightpath is up, the corresponding entries at all controllers that are alive are in state up.

Definition 6 a) Two controllers on some lightpath section for some wavelength $\lambda$ are said to be connected if the optical switches and the links between them on the lightpath are up.

b) Two controllers on some lightpath section for some wavelength $\lambda$ are said to strongly connected if they are connected and the controllers between them on the lightpath are also up.

In the following we assume that the UPDATE-TIMER is such that the frequency of LST updates is high compared to lightpath setup attempts. As seen in the proof of Lemma 3b), if this is not the case, there may be race conditions between the two that will prevent release of resources.

Lemma 3 a) A controller cannot stay indefinitely in state reserved.

b) Let $A_m$ and $A_p$ be two controllers that are strongly connected and remain so for sufficiently long time. If $A_m$ has the entry corresponding to the considered section in state up and $A_p$ does not have a corresponding entry, then $A_m$ will also delete the entry.

Theorem 3 (Release of Resources)

Suppose that the topological changes on the route of a lightpath have ceased and that the lightpath is not up. Then:

a) The corresponding entry is deleted at all controllers that do not receive the SETUP message and at all controllers that are strongly connected to one of the controllers that do not receive SETUP.

b) If the originator controller is up, the corresponding entry will be deleted at all controllers that are connected to it.

c) If the destination controller is up, the corresponding entry will be deleted at all controllers that are strongly connected to it.

d) If a link or an optical routing node is down, the corresponding entry will be deleted at all controllers that are strongly connected to the controllers that are adjacent to the failed link/router.

Extensions

The use of predefined lightpaths on each link requires use of a wavelength ($\lambda_1$) for a one-link lightpath on each link and M ports of the ATM switch dedicated to these lightpaths, where M is the degree of the node. Although the predefined lightpaths may be used for both control and data, there may not be sufficient wavelengths or ATM switch ports to accommodate them. In this case, one may work with a spanning tree or a ring for control messages. However this will decrease the reliability for control purposes. Also, maintaining the tree or ring in the event of failures requires complicated protocols, whereas our approach using the predefined one-link lightpaths on all links requires no maintenance at all. For instance, it is not clear how one can rebuild a spanning tree if one or more of the branches of the tree fails, without communication between the separated tree portions.

While our protocols ensure that there are no loop lightpaths with the status bits all set to 0, it is possible that there may still be loops with some of the router switches in the loop having their status bits set to 1. This may lead to undesirable effects at the physical layer such as saturation of the optical amplifiers (if any) in the loop. However, preventing such a phenomenon requires additional hardware at each switch port that disconnects the link corresponding to an unused port from the switch.

Having thus described our invention, what we claim as new and desire to secure by Letters Patents is:

1. In a communications network having a plurality of switching nodes interconnected by a plurality of links, each of said switching nodes having a switch and an associated controller which controls the configuration of said switch, a method of establishing a desired connection between an originating switching node of said switching nodes and a destination node of said switching nodes, said method comprising:

(a) computing a path in a controller of the originating node, the path comprising a set of said links interconnecting a set of said nodes needed to establish said desired connection from said originating node to said destination node;

(b) sending reservation requests from the controller of the originating node simultaneously through separate channels to each node of said set of nodes interconnected by said path to reserve and determine if said set of links is available to establish said desired connection along said path; and (c) upon receiving an acknowledgement from said set of nodes that said set of links is available and have been reserved, transmitting a setup message sequentially between adjacent nodes starting from said originating node to each node of said set of nodes along said path until said setup message reaches said destination node, where said setup message is transmitted only between two adjacent nodes at any given time, and where each node of said set of nodes changes its switch configuration in response to said setup message so as to interconnect said set of links to establish said desired connection.

2. In a communication network having a plurality of switching nodes interconnected by a plurality of links, each of said switching nodes having a switch and an associated controller which controls the configuration of said switch, a method of establishing a desired connection between an originating switching node of said switching nodes and a destination node of said switching nodes, said method comprising:

(a) storing a switch table at each of said switching nodes, each entry of said table identifying a connection through a switch of said each node, and said each entry indicating a state of said connection, where said state indicates whether said connection is currently established or is reserved for future use;

(b) computing a path in a controller of the originating node, the path comprising a set of said links interconnecting a set of said nodes required to establish said desired connection from said originating node to said destination node;

(c) transmitting reservation requests from the controller of the originating node simultaneously through separate channels to all other nodes of said set of nodes to reserve and determine if said set of links is available to establish said desired connection through said path using information in each said switch table of said set of nodes;

(d) updating each said switch table of each node of said set of nodes to indicate that corresponding links of said set of links are reserved for future use to establish said desired connection, each node of said set of nodes being updated in response to receiving one of said reservation requests; and (e) upon receiving an acknowledgement from said set of nodes that said links for said desired connections are available and have been reserved for future use, transmitting a setup message sequentially between adjacent nodes of said set of nodes starting from said originating node to each node of said set of nodes along said path until said setup message reaches said destination node, where said setup message is transmitted only between two adjacent node controllers at any given time, where each controller of each node of said set of nodes changes the state of said desired connection in said switching table from reserved to a state indicating current use of said desired connection where said each controller of each node of said set of nodes changes its switch configuration in response to said setup message so as to interconnect said set of links to establish said desired connection.

3. In a communications network having a plurality of switching nodes interconnected by a plurality of links, each of said switching nodes having a switch and an associated controller which controls the configuration of said switch, each node also having a switch table wherein individual entries of said switch table identify the status of a connection with another switching node, a method for updating the switch table in each switching node, said method comprising:

(a) each of said controllers in each of said switching nodes periodically transmitting the contents of its switch table to neighboring controllers in neighboring switching nodes;

(b) each of said neighboring controllers, upon receiving said contents of the switch table transmitted from a neighboring controller, updating its own switch table, where a switch table entry in the receiving neighboring controller, that points to a connection to the neighboring switching node having the controller from which the switch table was received, is deleted if the received contents of the switch table has no related entry that points to the receiving neighboring switching node; and propagating the deleted entry along a connection made through a plurality of said switching nodes, thereby taking the connection down.

4. In a communications network having a plurality of switching nodes interconnected by a plurality of links, each of said switching nodes having a switch and an associated controller which controls the configuration of said switch, each node also having a switch table wherein individual entries of said switch table identify the status of a connection with another switching node, a method for updating the switch table in each switching node, said method comprising:

(a) each of said controllers in each of said switching nodes periodically transmitting the contents of its switch table to neighboring controllers in neighboring switching nodes; and (b) each of said neighboring controllers, upon receiving said contents of the switch table transmitted from a neighboring controller, updating its own switch table, where a switch table entry in the receiving neighboring controller, that points to a connection to the neighboring switching node having the controller from which the switch table was received, is deleted if the received contents of the switch table has no related entry that points to the receiving neighboring switching node;

wherein in response to one of said switching nodes deleting an entry in its switch table, corresponding entries are subsequently deleted by all controllers along a connection made through a plurality of said switching nodes, thereby taking the connection down.

5. In a communications network having a plurality of switching nodes interconnected by a plurality of links, each of said switching nodes having a switch and an associated controller which controls the configuration of said switch, an apparatus for establishing a desired connection between an originating switching node of said switching nodes and a destination node of said switching nodes, said apparatus comprising:

(a) means associated with an originating switching node controller for computing a path comprising of a set of said links interconnecting a set of said nodes needed to establish said desired connection from said originating node to said destination node;

(b) means associated with said originating switching node controller for sending reservation requests simultaneously through separate channels to each node of said set of nodes interconnected by said path to reserve and determine if said set of links are available to establish said desired connection along said path; and (c) means for, upon receiving an acknowledgement from said set of nodes that said set of links for said desired connection is available and has been reserved, transmitting a setup message sequentially between adjacent nodes starting from said originating node to each node of said set of nodes along said path until said setup message reaches said destination node, where said setup message is transmitted only between two adjacent nodes at any given time, and where each node of said set of nodes changes its switch configuration in response to said setup message so as to interconnect said set of links to establish said desired connection.

6. An apparatus as recited in claim 5 wherein said switching nodes are optical switching nodes.

7. An apparatus as recited in claim 5 wherein said links comprise optical fibers which interconnect a pair of nodes of said set of nodes.

8. An apparatus as recited in claim 5 wherein said connection is a lightpath comprising a path in the network and a wavelength on each link in said path, with said set of links being optical fibers interconnecting said set of nodes, with said set of nodes being optical switching nodes.

9. In a communications network having a plurality of switching nodes interconnected by a plurality of links, each of said switching nodes having a switch and an associated controller which controls the configuration of said switch, apparatus for establishing a desired connection between an originating switching node of said switching nodes and a destination node of said switching nodes, said apparatus comprising:

(a) means for storing a switch table at each of said switching nodes, each entry of said table identifying a connection through a switch of said each node, and said each entry indicating the state of said connection, where said state indicates whether said connection is currently established or is reserved for future use;

(b) means associated with a controller of an originating node for computing a path comprising a set of said links interconnecting a set of said nodes required to establish said desired connection from said originating node to said destination node;

(c) means for transmitting reservation requests, from said controller of said originating node, simultaneously through separate channels to all other nodes of said set of nodes to reserve and determine if said set of links is available to establish said desired connection through said path using information in each said switch table of said set of nodes;

(d) means for updating each said switch table of each node of said set of nodes to indicate that corresponding links of said set of links are reserved for future use to establish said desired connection, each node of said set of nodes being updated in response to receiving one of said reservation requests; and (e) means responsive to a receipt of an acknowledgement from said set of nodes that said links for said desired connections are available and have been reserved for future use, for transmitting a setup message sequentially between adjacent nodes of said set of nodes starting from said originating node to each node of said set of nodes along said path until said setup message reaches said destination node, where said setup message is transmitted only between two adjacent node controllers at any given time, where each controller of each node of said set of nodes changes the state of said desired connection in said switching table from reserved to a state indicating current use of said desired connection where said each controller of each node of said set of nodes changes its switch configuration in response to said setup message so as to interconnect said set of links to establish said desired connection.

10. In an optical communications network having a plurality of wavelength division multiplexing optical switching nodes that can be interconnected by links, each of said optical switching nodes having an optical switch and an associated optical switch controller for controlling a configuration of said optical switch, apparatus for establishing a desired connection between an originating optical switching node and a destination optical switching node, said apparatus comprising:

(a) means for storing a switch table at each of said optical switching nodes, wherein individual ones of entries of said switch table specify a connection through an optical switch of each node, each entry further specifying a state of said connection, where said state indicates whether said connection is currently established or is reserved for future use, and where a connection is a lightpath comprising a path having at least one link through the network and a wavelength associated with each link in said path, with said links being carried through optical conductors that interconnect said nodes;

(b) means associated with a controller of an originating node for computing a path comprising a set of links for interconnecting a set of said nodes that are required to establish the computed path from said originating node to said destination node;

(c) means for transmitting reservation requests, from said controller of said originating node, simultaneously to said set of nodes to reserve and determine, using information in each said switch table of said nodes, if said set of links is available to establish the computed path;

(d) means for updating each said switch table of each node of the set of nodes to indicate that corresponding links of said set of links are reserved for future use to establish said computed path, each said switch table being updated in response to receiving one of said reservation requests at the node; and (e) means responsive to a receipt of an acknowledgement from said set of nodes that said links for said computed path are available and have been reserved for future use, for transmitting a setup message sequentially from said originating node to each node along said computed path until said setup message reaches said destination node, where said setup message is transmitted only between two adjacent node controllers at any given time, where each controller of each node changes, in response to said setup message, the state of a corresponding entry of said switching table from a reserved state to a state indicating current use of said connection, where said each controller of each node of said set of nodes changes its switch configuration, in response to said setup message, so as to establish said computed path.

\* \* \* \* \*